Sept. 7, 1965  R. R. CLUNE ETAL  3,205,097
ALKALINE DRY CELL FOR MEDIUM LOW TEMPERATURE OPERATION
Filed May 12, 1964
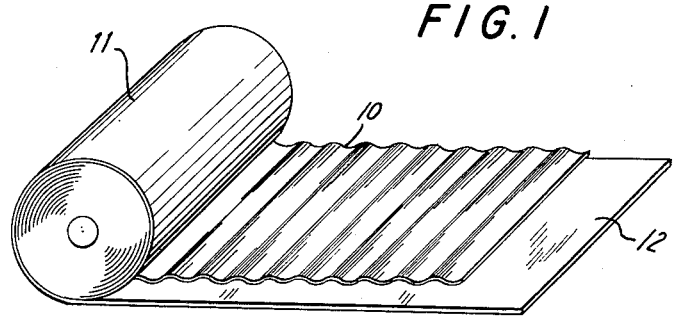
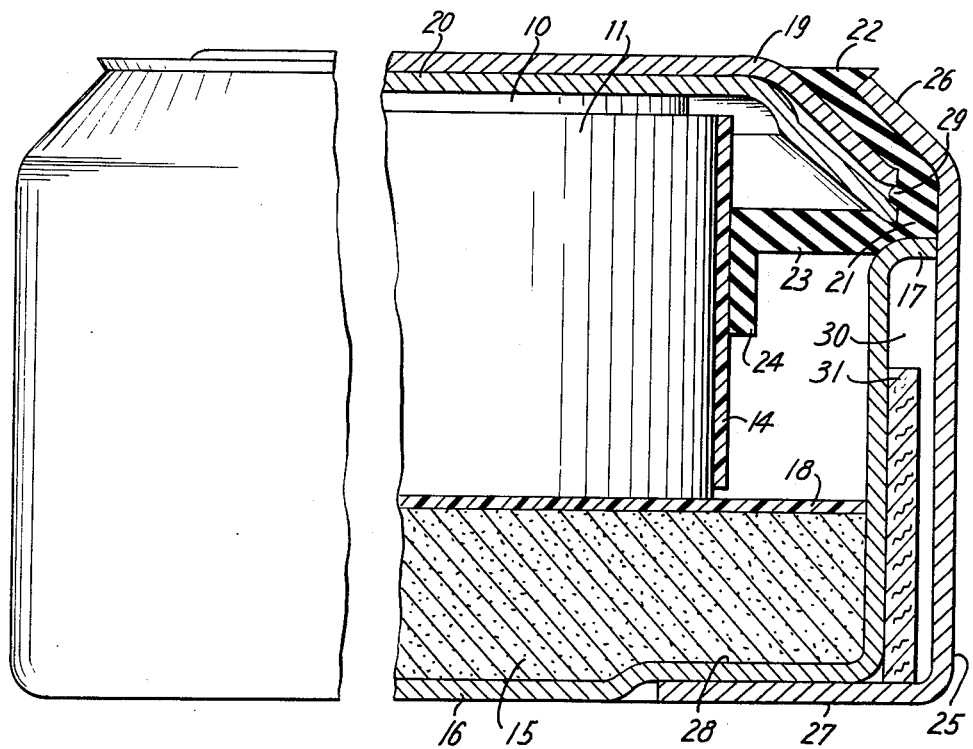
INVENTOR.
RICHARD R. CLUNE
ROGER M. GOODMAN
BY
ATTORNEY United States Patent Office 3,205,097
Patented Sept. 7, 1965

3,205,097
ALKALINE DRY CELL FOR MEDIUM LOW
TEMPERATURE OPERATION
Richard R. Clune, Ardsley, N.Y., and Roger M. Goodman, Clifton, N.J., assignors to P. R. Mallory & Co., Inc., Indianapolis, Ind., a corporation of Delaware
Filed May 12, 1964, Ser. No. 366,707
8 Claims. (Cl. 136—102)

The present application is a continuation-in-part of our copending application Serial No. 37,911, filed June 22, 1960, entitled Alkaline Dry Cell for Medium Low Temperature Operation, now abandoned.

This invention relates to alkaline dry cells, and, more particularly, to alkaline dry cells suitable for operations at medium low temperatures.

Alkaline dry cells of the type disclosed and claimed in Ruben Patent 2,422,045 have acquired great commercial importance in recent years due to their valuable characteristics, the most important of which are: a relatively high output current capacity under continuous load for a relatively long time; a substantially sustained voltage or flat voltage curve with continuous output throughout relatively long cell life; a relatively high ratio of current output capacity to cell volume; and a relatively long open circuit life over a relatively wide temperature range without undue deterioration. A preferred embodiment of these cells comprises an amalgamated zinc anode, a cathode depolarizer of mercuric oxide having a smaller amount of finely divided graphite intimately admixed therewith, and an immobilized body of potassium hydroxide electrolyte initially containing a substantial quantity of alkali metal zincate in solution, said zincate being present in an amount sufficient to reduce the open circuit reactivity between said electrolyte and said anode to a negligible value. The anode may be in various forms, such as in that of a porous pressed zinc powder body, or as disclosed and claimed in Ruben Patent 2,422,046, in the form of a so-called "wound anode", comprising a strip of zinc foil and a strip of absorbent spacer material wound together into a roll in offset relation so that the edges of the respective strips project at opposite ends of the roll. Preferably, the zinc strip or foil is corrugated to allow the expansion of the spacer strip upon its being impregnated with the electrolyte. Alkaline dry cells of the described character have met with immediate public acceptance upon their introduction and are used in very large quantities for both civilian and military applications.

As with most primary cells, the efficiency of alkaline dry cells of the described type decsesases considerably when the cells are operated at low temperatures, such as at temperatures at or below the freezing point of water. Although the characteristics of the so-called wound anode cells disclosed in the above-mentioned Ruben Patent 2,422,046 are appreciably better in this respect than those of cells provided with pressed zinc powder anodes, even the capacity of such cells quickly decreases with decreasing temperatures to such a degree that only very little useful current output can be obtained at temperatures in the order of −20° F. Thus, a conventional wound anode alkaline cell having a service life of 78.85 hours at 70° F., has a service life of only 60.77 hours at 32° F., 19.58 hours at 0° F. and 4.17 hours at −20° F on a load of 22 ohms when discharged to 0.9 volt. As there are many important practical applications where it is highly desirable to obtain satisfactory cell operation at low temperatures, this constituted a serious problem for which the art was unable to offer a practical solution. As a matter of fact, it had been assumed for many years by those skilled in the art that the sharp decrease in useful output with decreasing temperatures was largely due to slowing down of the electrochemical cell reactions at low temperatures and thus was inherent to primary cells of the type contemplated, in other words, that the problem was incapable of a practical solution.

It has been discovered that the outstanding problem may be solved in a remarkably simple manner.

It is an object of the present invention to provide a primary cell capable of supplying a substantial percentage of its room temperature capacity at relatively low temperatures.

It is another object of the present invention to provide an alkaline dry cell which is capable of supplying 70–80% of its normal or room temperature capacity at the usual current densities at temperatures of 32° F. and lower.

It is a further object of the invention to provide an alkaline primary cell, specifically one having an anode comprising an amalgamated corrugted wound zinc strip, a cathode depolarizer comprising mercuric oxide intimately admixed with graphite, and an alkali metal hydroxide electrolyte having alkali metal zincate dissolved therein, which is capable of supplying current at useful densities at temperatures as low as −20° F.

The invention also contemplates an alkaline dry cell suitable for medium low temperature operation which is simple in construction, reliable in operation and which may be readily manufactured with existing production equipment at a cost which is not appreciably higher than that of manufacturing conventional cells.

Other and further objects and advantages of the present invention will become apparent from the following description, taken in conjunction with the accompanying drawing, in which:

FIG. 1 is a persepctive view showing a step in the manufacture of a primary cell anode embodying the invention; and FIG. 2 is a longitudinal sectional view, having parts in elevation, of a primary cell embodying the invention.

Broadly stated, the present invention is based on the discovery that the most important cause of the rapid decrease in the capacity of alkaline dry cells at low temperatures is the building up of a relatively thick and dense layer of zinc oxide on the zinc anode. In alkaline dry cells of the type disclosed in the above mentioned Ruben patents, zinc oxide is formed during discharge both at room and at lower temperatures in accordance with the reaction $HgO+Zn \rightarrow Hg+ZnO$ and adequate anode area must be provided to keep the thickness of the zinc oxide layer formed within tolerable limits. However, at room temperature, some of the zinc oxide is dissolved in the electrolyte, increasing the zincate concentration thereof, whereby the build-up of zinc oxide layer is considerably slowed down. At low temperatures, the ionic mobility of the electrolyte decreases and the viscosity of the electrolyte increases, both of which factors tend to increase the rate of deposition of zinc oxide. As in the said cells the electrodes are very closely spaced and the amount of electrolyte present is kept at a minimum, furthermore, as the zinc oxide formed takes up approximately twice the space of the original zinc, the following detrimental conditions will occur:

(1) The increasing thickness of the zinc oxide layer on the anode will exert pressure on the electrolyte absorbent spacer and barrier layer interposed between the anode and the cathode and will squeeze out a substantial percentage of the electrolyte from the spacer. Thus, the quantity of electrolyte that remains available will be insufficient for providing a constant electrolyte path or for carrying out the electrochemical reactions. The internal resistance of the cell will increase, and, as a result, the efficiency of the cell will decrease.

(2) Upon further building up of the thickness of the zinc oxide layer, after the interspace between the turns of the corrugated zinc foil has been completely filled up, formation of additional zinc oxide will cause a substantial build-up in pressure. Thus, the zinc oxide layer will become strongly compressed and dense instead of being porous and electrolyte-permeable as in the case at room temperature. Little, if any, electrolyte will reach the underlying unreacted anode metal so that the internal resistance of the cell will be further increased and the efficiency will be further decreased.

(3) After the interspace between the turns of corrugated zinc foil has been completely filled up with dense zinc oxide, any additional zinc oxide formed, having no space for its accommodation, will be extruded at the ends of the wound anode roll. Particularly at the upper end of the anode roll, where the protruding edge of the zinc anode foil or strip is in pressure contact with the top disc constituting one of the terminals of the cell, this will cause serious difficulties. The gradually increasing quantity of zinc oxide in that critical region will not only interpose a layer of high resistance between the anode and its terminal but in some cases will actually force the top disc away from the protruding edge of the zinc anode strip thereby interrupting the flow of current and destroying the practical usefulness of the cell.

While it was a surprising and unexpected discovery that the greatly lowered efficiency or even failure of conventional alkaline dry cells was principally due to mechanical and structural considerations, rather than to a general slowing down of the electrochemical cell reactions as it was heretofore generally assumed, experimental evidence derived from large number of cells discharged at low temperatures have fully confirmed that cell operation at such temperatures occurs in the manner described in the foregoing.

On this clear recognition and full understanding of the underlying causes is based the solution of the outstanding problem of providing a marked increase of cell efficiency at low temperatures, while maintaining good efficiency at ambient room temperature. In accordance with the present invention, provision must be made for the proper deposition and accommodation of the zinc oxide, without displacement of the alkaline electrolyte in the absorbent, without undesirable densification of the zinc oxide formed and in the absence of any tendency to extrude zinc oxide into the critical region of contact between the zinc foil and the top closure and terminal plate. This is accomplished by deep corrugations of the zinc anode strip which is then wound up with an absorbent spacer strip in offset relation into a roll having the zinc strip protruding at one end and the spacer strip protruding at its other end. The said corrugations should be deep enough so as to provide sufficient spacing between adjacent turns of the anode roll for accommodating the zinc oxide. As it has been pointed out in the foregoing, zinc oxide takes up twice the space of the original zinc. Therefore, the zinc strip should be corrugated to a thickness greatly exceeding double of the original thickness of the strip and preferably to about three and one-half times the original thickness of the strip. The upper limit of the depth of corrugations is determined by mechanical considerations, such as structural strength, ease of manufacture and also by considerations of economy of space. Generally speaking, it is undesirable to corrugate the strip to a thickness substantially exceeding five times its original thickness.

The original thickness of the zinc strip may be between 0.003" and 0.005", the preferred thickness being 0.004", the said strip being provided with 35 to 45, preferably 40 corrugations per inch. The interleaved absorbent spacer strip is formed of alkali resistant cellulosic material, such as paper having a thickness between 0.006" and 0.014", preferably between 0.006" and 0.010", the latter range corresponding to a nominal thickness of 0.008". All of these thicknesses are those measured before absorption of the electrolyte. One paper which has been found to be suitable is Dexter paper produced from mixed hemp and wood fibres which are treated with a solution of sodium hydroxide in the pulp stage. This produces a reaction of the alkali with part of the paper constituents and results in a paper which is resistant to alkalies and hence will not be appreciably weakened by the alkaline electrolyte to be used in the primary cell. Jute and cotton fibre papers may also be used for the spacer strip and in some cases may be of sufficient purity or alkali resistance so that the alkali treatment of the pulp may not be required. As a practical example of a wound anode embodying the invention, excellent results have been obtained by corrugating a zinc strip having an initial thickness of 0.004" to a thickness of 0.014", as measured between two plane surfaces, at the rate of 40 corrugations per inch and winding up this corrugated zinc strip with a strip of Dexter paper 0.008" thick.

It is well known that corrugation of zinc strips in wound anode alkaline cells has been previously used, such being disclosed in the above-mentioned Ruben Patent 2,422,046, which suggests corrugation of a zinc foil 0.002" thick to an overall thickness of 0.004" to 0.005", that is to 2–2½ times of the original thickness. The object, however, is not to accommodate the zinc oxide formed but merely to provide some extra space for the interleaved absorbent layer which would swell and increase in thickness somewhat when impregnated with the electrolyte. Experience has demonstrated that such shallow corrugations would not solve the outstanding problems of zinc oxide build-up and would not accomplish the new results obtained by the deep corrugations of the invention.

It has been further found that, in addition to the deep corrugations, it is desirable to reduce the zincate content of the electrolyte below the concentration now used in conventional wound anode cells. The object of this is two-fold. In the first place, the conductivity of the alkaline electrolyte decreases with increasing zincate concentration and thus the decrease in conductivity experienced at lower operating temperatures is somewhat compensated for by reducing the zincate concentartion. Furthermore, at lower concentartions of zincate, dissolution of the zinc oxide formed on the anode in the electrolyte is facilitated so that less zinc oxide will have to be accommodated. Zincate concentrations suitable for the purposes of the invention are obtained by dissolving 1.0% to 2.5% ZnO in a mixture of 32% to 36% KOH and 61.5% to 67.0% $H_2O$, all percentages being by weight. The resulting zincate concentration is considerably lower than those now used in conventional wound anode alkaline cells, which are between 5.3% and 7.4% zinc oxide for similar amounts of KOH and $H_2O$.

Referring now to the drawing, a preferred embodiment of the invention will be described. FIGURE 1 shows a preferred method of making the anode spacer assembly. A strip of zinc foil 10, which has been deeply corrugated in accordance with the invention, is wound into a roll 11 with an interleaved spacer strip 12 of alkali resistant paper. The zinc foil and paper strips are wound into the roll 11 in such a manner that one edge of the zinc foil projects a fraction of an inch at one end of the roll and one edge of the paper strip projects a similar distance beyond the zinc at the other end of the roll. The paper strip also extends beyond the end of the zinc strip so as to provide at least one complete extra turn of paper on the outside of the roll. A length of polyethylene strip 14 is wrapped tightly around the dry roll and has its ends heat sealed together to hold the roll assembled. After the assembly, the zinc strip is amalgamated, preferably by the method disclosed in Williams Patent 2,422,606 and the spacer anode is impregnated with the aqueous alkaline electrolyte.

Cathode depolarizer 15, comprising a mixture of mercuric oxide with a smaller amount of graphite, is compressed in the bottom of cylindrical inner can 16 of nickel plated steel having an outwardly extending flange 17 at its open end, and the top surface of the depolarizer is covered by a microporous barrier layer 18 of polyvinyl chloride.

The top closure of the cell is of the type disclosed in Williams Patent 2,712,565 and comprises a pair of dished metal plates 19 and 20 having their centers nested in one another and having their marginal edges slightly separated from each other. Preferably, the outer plate 19 is formed of nickel-plated steel and the inner plate 20 is formed of tin-plated steel. An insulating sealing grommet 21 of a suitable elastomer is stretched around the circumferential edges of top plates 19 and 20. As shown in the drawing, grommet 21 is integrally formed with an inwardly inclined upper portion 22 hugging the corresponding marginal region of outer plate 19, a radially extending portion 23, and a downwardly depending portion 24 holding the assembled anode roll 11 properly spaced and centered within inner can 16. It will be noted that the said anode roll is held in such a position that upon placing the top closure plates 19, 20 with grommet 21 therearound on flange 17 of the inner can, the edge of the zinc foil 10 protruding at the upper end of the anode roll is in pressure contact with the inner surface of inner top closure plate 20 and the edge of the paper strip 12 protruding at the lower end of the anode roll is resting on the exposed surface of barrier layer 18. It is also possible, however, to use the improved top closure disclosed in Clune Patent 3,096,217 in which the insulating sealing grommet is molded around the circumferential regions of the two dished metal plates. In this type of closure the outer plate is nickel-plated on both of its faces, whereas the inner plate is nickel-plated on its outer face and is tin-plated on its inner face thereby eliminating the presence of dissimilar metals in the interspace between the said plates.

The entire cell assembly described in the foregoing is now slipped into a nickel-plated outer can 25 in the form of a nickel-plated cylindrical steel sleeve the upper mouth portions 26 of which temporarily are likewise cylindrical and the bottom portions 27 of which extend inwardly and are accommodated in the correspondingly relieved portion 28 of the bottom surface of inner can 16, so that the bottom of the cell presents a substantially plane surface. The cell is then sealed by crimping down marginal portions 26 of outer can 25, as shown in FIG. 2, so that grommet 21 is strongly compressed between the said portions 26 and flange 17 of inner can 16. The center portion of grommet 22, denoted by numeral 29, will be caused to slightly protrude into the interspace between the circumferential edges of top plates 19 and 20 thereby further assuring the provision of a reliable seal, as this is more fully described in the above-mentioned Williams Patent 2,712,565. When the top closure disclosed in Clune Patent 3,096,217 is used, a portion of the molded grommet extends for a substantial distance into the interspace between the metal plates and thus further improves the seal.

Under normal operating conditions of storage and discharge, the cell will remain completely sealed. However, upon excessive increase in the internal pressure for any reason, the double cell top comprising plates 19 and 20 will be slightly lifted up so that the gas developed can vent around the edge of flange 17 into the interspace 30 between the inner and outer cans 16 and 25 and from there between the corresponding portions 28 and 27 of the said cans into the atmosphere. A ring 31 of absorbent paper is arranged in interspace 30 in order to absorb any electrolyte which may be vented with the gas. For further details of the operation of this self-venting cell construction reference may be had to Colton Patent 2,636,062.

In a typical cell embodying the invention, the diameter of the cell was 1.458 inches and its height was 0.510 inch. The zinc anode was in the form of a zinc strip 0.004" thick, 54" long and 0.250" wide, corrugated to a thickness of 0.014" at the rate of 40 corrugations per inch. The anode area was 27 square inches, and the depolarizer area was 1.385 square inches. The interleaved absorbent spacer strip was made of Dexter paper having a thickness of 0.008". The electrolyte comprised 34% KOH, 2% zinc oxide and 64% water, the total amount of electrolyte in the cell being about 5.8 grams. The ratio of electrolyte to zinc was 1 gram of electrolyte to 1.07 grams of zinc.

The following table is a comparison of the service life of the above-mentioned typical cell of the invention in which the zinc is deeply corrugated (a zinc strip having an original thickness of 0.004" corrugated to a thickness of 0.014" at the rate of 40 corrugations per inch), with the service life of a conventional cell of identical structure and dimensions in which the zinc is provded with the usual, shallow corrugations (a zinc strip having an original thickness of 0.004" corrugated to a thickness of 0.010" at the rate of 40 corrugations per inch), at various operating temperatures. In both groups of cells, the spacer layer was made of Dexter paper 0.008" thick and the electrolyte had the same composition.

Hours of Service of Cells Discharged to 0.9 volts on a Load of 22 ohms.

| Temperature | Cell of the Invention (Deep Corrugations (3½ times original thickness) hours | Conventional Cell (Shallow Corrugations (2½ times original thickness) hours |
|---|---|---|
| 70° F | 79.12 | 78.85 |
| 32° F | 70.53 | 60.77 |
| 20° F | 66.46 | 56.36 |
| 0° F | 30.25 | 19.58 |
| −20° F | 6.78 | 4.17 |

From the foregoing table, the remarkable superiority of the cells of the invention will be readily appreciated. More particularly, it will be noted that the cells embodying the invention provide a very great increase in efficiency at low temperatures, while maintaining good efficiency at ambient room temperature.

Although the present invention has been disclosed in connection with a preferred embodiment thereof, variations and modifications may be resorted to by those skilled in the art without departing from the principles of the invention. All of these variations are considered to be within the true spirit and scope of the present invention, as disclosed in the foregoing description and defined by the appended claims.

What is claimed is:

1. A primary cell suitable for low temperature operation comprising a metal container, a pressed powder compact in the bottom of said container including a depolarizing electrode, an anode-spacer structure in said container comprising a roll of zinc foil interleaved with absorbent sheet spacer material, the edge of said foil projecting at a first end of said roll and spacer material projecting at the second end of said roll, an alkaline electrolyte absorbed in said spacer material, said second end of said roll pressing against the top of said compact, and a metal top for and insulated from said container pressing against the first end of said roll, said foil being corrugated at the rate of 35 to 45 corrugations per inch to a depth such that its thickness is not less than 3½ times and not materially more than 5 times its original thickness before corrugation.

2. A primary cell suitable for low temperature operation comprising a cylindrical metal cup, a compact including a depolarizing electrode pressed into the bottom of said cup and having a substantially plane upper surface, an anode-spacer structure in said cup comprising a roll of zinc foil strip interleaved with porous sheet spacer material strip, the edge of said foil strip projecting at a first end of said roll and spacer material projecting at the second end of said roll, an alkaline electrolyte absorbed in said spacer material, said second end of said roll pressing against the upper surface of said compact, a metal top disc for said cup pressing against the first end of said roll, and an insulating sealing ring compressed between cooperating regions of said cup and said disc defining therewith a sealed enclosure for the cell, said foil being corrugated at the rate of 35 to 45 corrugations per inch to a depth such that its thickness measured between two plane surfaces after corrugation but before winding it into a roll is not less than 3½ times and not materially more than 5 times the original thickness of the uncorrugated foil thereby providing sufficient space between adjacent turns of the foil for accommodation of zinc oxide thereon and of swelling of the spacer material therebetween, said spacer material being of alkali resistant paper.

3. A primary cell suitable for low temperature operation comprising a cylindrical metal cup, a cathode depolarizer comprising mercuric oxide pressed into the bottom of said cup and having a plane upper surface, and an anode-spacer structure in said cup comprising a roll of zinc foil strip interleaved with porous paper strip, the edge of said foil strip projecting at a first end of said roll and the edge of said paper strip projecting at the second end of said roll, a potassium hydroxide electrolyte absorbed in said spacer material, said second end of said roll pressing against said depolarizing electrode, a metal top disc for said cup pressing against the first end of said roll, and an insulating sealing ring compressed between cooperating portions of said cup and top disc to seal the cell, said zinc foil having an initial thickness between 0.003" and 0.005" and being corrugated at the rate of 35 to 45 corrugations per inch to a thickness not less than 3½ times and not more than 5 times original thickness, said paper strip being of alkali resistant paper.

4. A primary cell suitable for low temperature operation comprising a container, a cathode depolarizer in said container, an anode-spacer roll in said container comprising interleaved strips of zinc foil and porous cellulosic sheet material, said strips being offset so that said foil projects at a first end of said roll and said porous sheet material at the second end thereof, an alkaline electrolyte absorbed in said sheet material, and a terminal for said cell secured in the mouth of said container and pressing against said first end of said roll, said electrolyte containing an appreciable amount of alkali metal zincate, said strip of zinc foil being corrugated at the rate of 35 to 45 corrugations per inch to a thickness not less than 3½ times and not materially more than 5 times its original thickness thereby providing sufficient space between adjacent turns thereof to accommodate the zinc oxide produced thereon and the swelling of the spacer material therebetween during operation of the cell.

5. A primary cell suitable for low temperature operation comprising a container, a cathode depolarizer electrode in the bottom thereof, a roll in said container comprising interleaved layers of zinc foil and porous cellulosic spacer material, said layers being offset so that the layer of zinc foil projects at the upper end of said roll, a conductive top on and insulated from said container in pressure contact with the projecting edge of said zinc foil, and an aqueous alkaline electrolyte solution absorbed in said layer of spacer material and containing 1.0% to 2.5% of dissolved zinc oxide for each 100 grams of the solution, said zinc foil being corrugated at the rate of 35 to 45 corrugations per inch to a thickness not less than 3½ times and not materially more than 5 times its original thickness thereby providing sufficient space between adjacent turns thereof to accommodate the zinc oxide deposited thereon and the swelling of the spacer material therebetween, throughout the useful life of the cell.

6. A primary cell suitable for low temperature operation comprising a metal container, a cathode depolarizer in the bottom thereof, a roll in said container comprising interleaved layers of zinc foil and porous cellulosic spacer material, said layers being offset so that the layer of zinc foil projects at the upper end of said roll, a conductive top for and insulated from said container and defining therewith a sealed enclosure for the cell, said roll being held under pressure between said top and said cathode depolarizer with said top being in face to face contact with the projecting edge of said zinc foil, and an aqueous potassium hydroxide electrolyte absorbed in said spacer material composed of 1.0% to 2.5% zinc oxide, 32% to 36% potassium hydroxide and 61.5% to 67.0% water, said zinc foil being corrugated at the rate of 35 to 45 corrugations per inch to a thickness not less than 3½ times and not materially more than 5 times its original thickness thereby providing sufficient space between adjacent turns thereof to accommodate the zinc oxide deposited thereon and swelling of the spacer material therebetween without excessive increase in pressure throughout the useful life of the cell.

7. The primary cell claimed in claim 6 in which the conductive top for the container comprises a pair of dished metal plates having their centers nested in one another and having their marginal edges slightly separated from each other.

8. The primary cell claimed in claim 6 in which the metal container and the conductive top insulated therefrom are maintained in co-operative and sealing relation by means of a concentric metal sleeve while capable of limited venting displacement with respect to each other upon the development of excessive internal pressure.

References Cited by the Examiner

UNITED STATES PATENTS

| | | | |
|---|---|---|---|
| 2,422,046 | 6/47 | Ruben | 136—107 |
| 2,463,565 | 3/49 | Ruben | 136—107 |
| 2,571,616 | 10/51 | Ruben | 136—107 |
| 2,624,767 | 1/53 | Moulton | 136—102 |
| 2,629,758 | 2/53 | Ruben | 136—107 |
| 2,810,008 | 10/57 | Bikerman | 136—102 |

JOHN H. MACK, *Primary Examiner.*